Patented Aug. 4, 1931

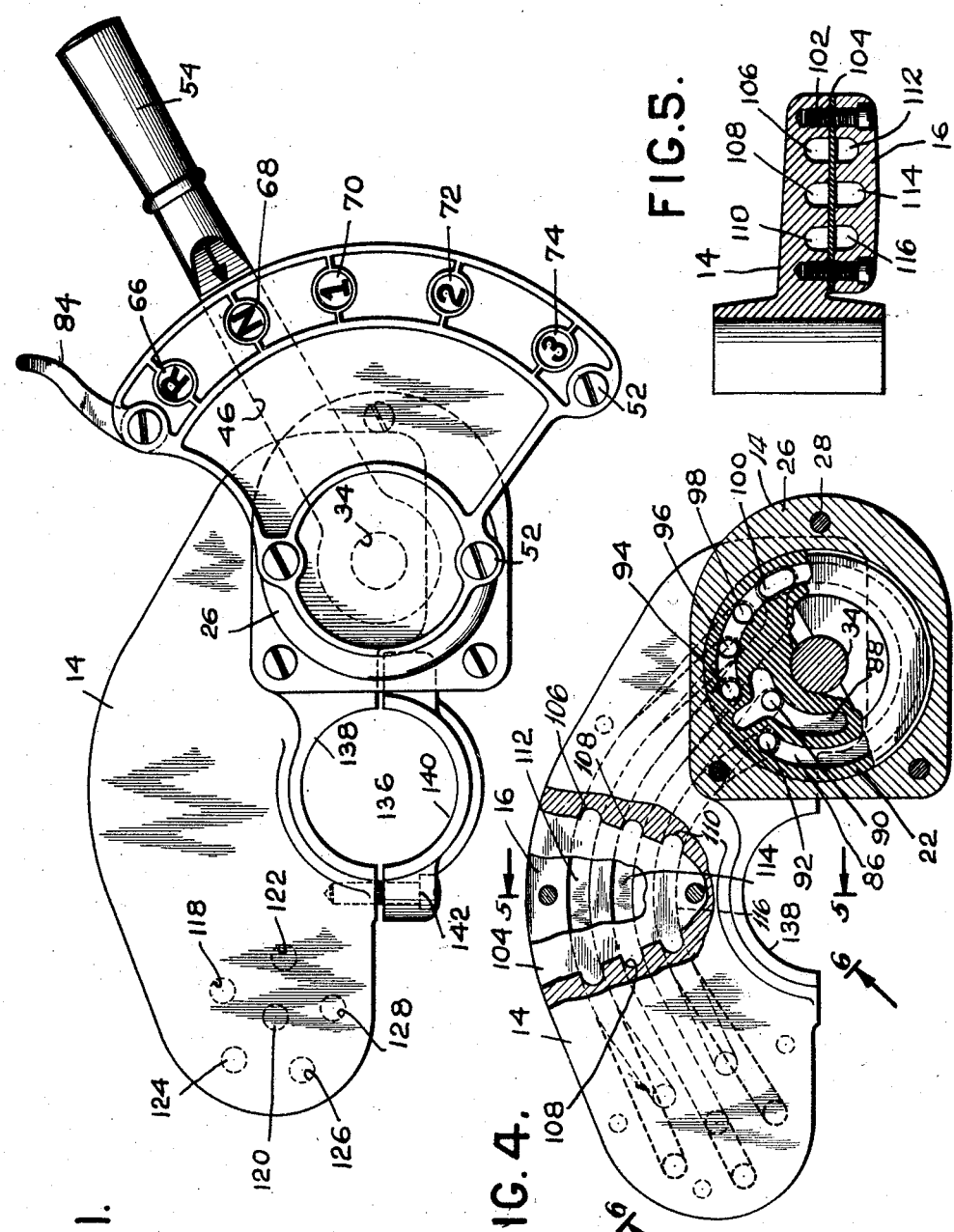

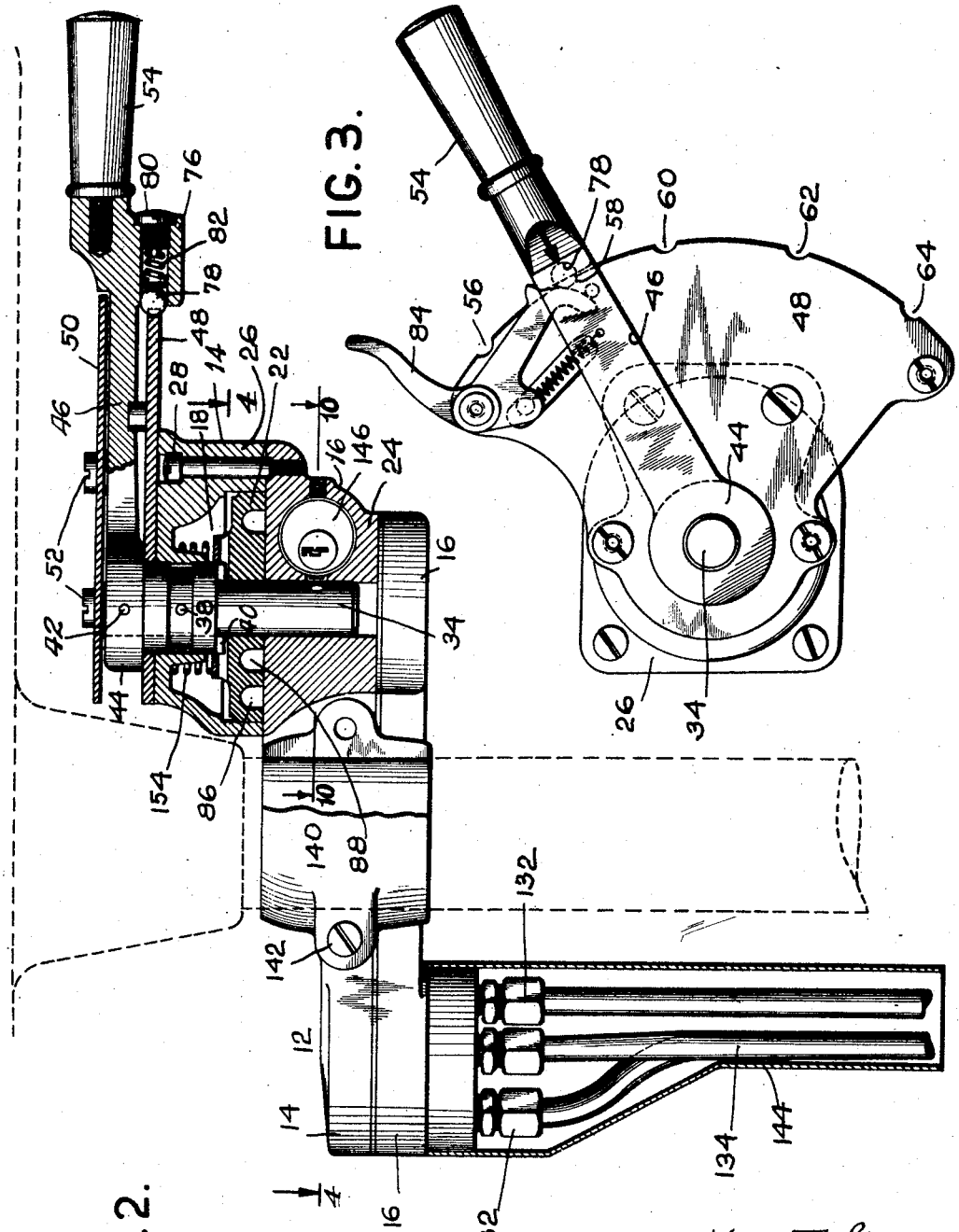

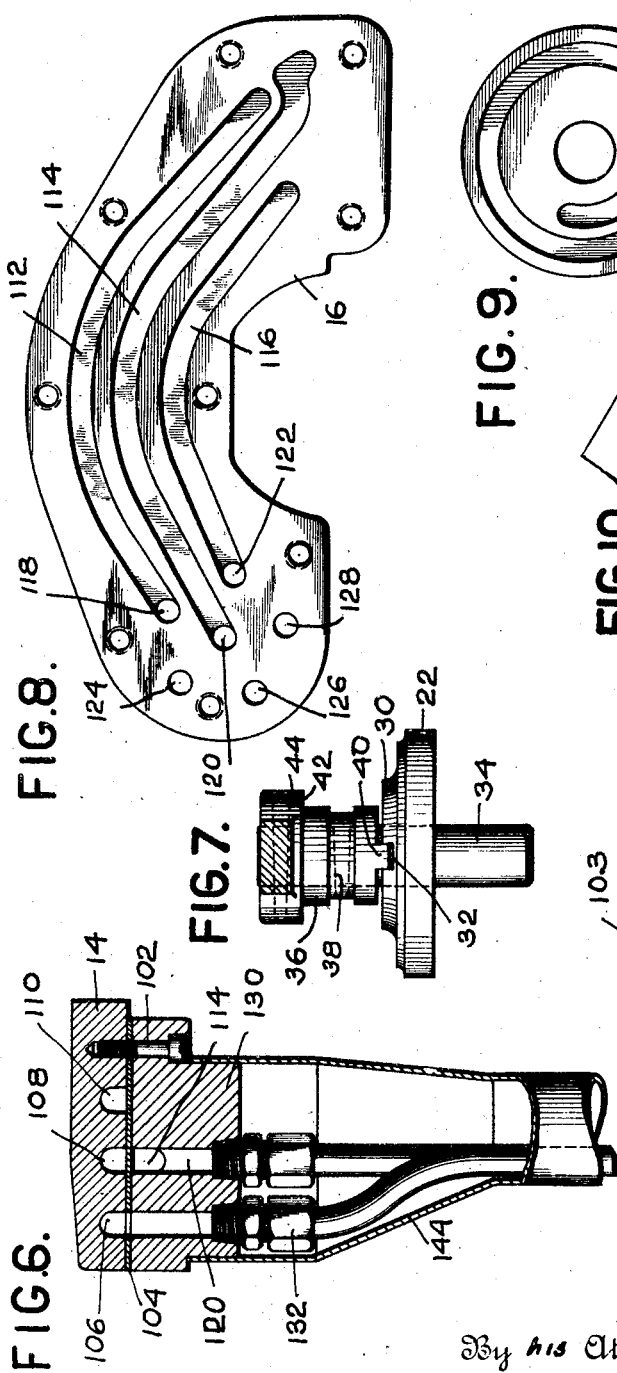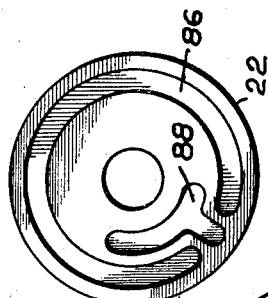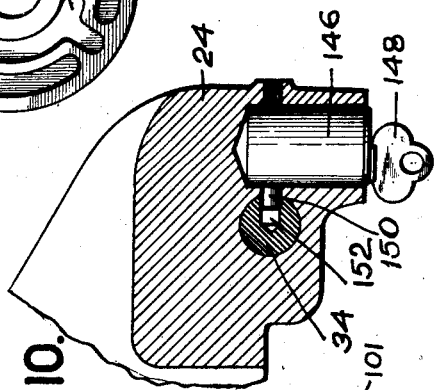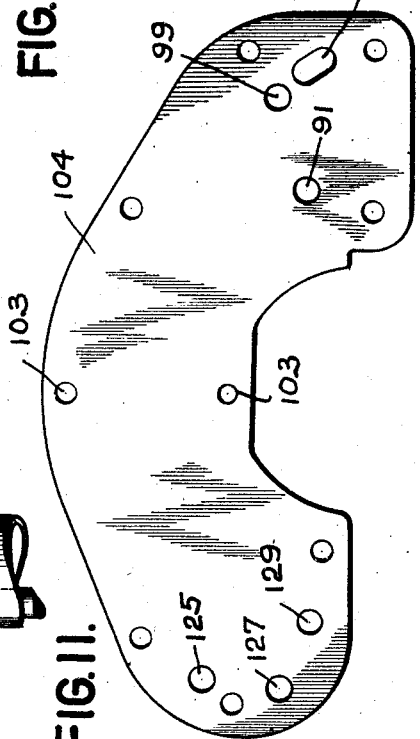

1,817,365

UNITED STATES PATENT OFFICE

HARRY T. GOSS, OF RUTHERFORD, NEW JERSEY, ASSIGNOR TO UNIVERSAL GEAR SHIFT CORPORATION, OF NEW YORK, N. Y., A CORPORATION OF DELAWARE

PNEUMATIC GEAR SHIFT CONTROL

Application filed April 28, 1928. Serial No. 273,628.

My invention relates to improvements in pneumatic gear shifts for use on motor cars, and relates more particularly to improvements in the valve, its mounting and its controlling mechanism. It is a particular object of my invention to provide, in a single mounting, a quadrant, a valve and a valve control that will be much more compact than previous structures, that will be adapted to be completely mounted within a small space directly under the steering wheel, with no parts projecting into the space intended to accommodate the driver's legs and feet. It is further intended to produce a structure in which the operating handle is mounted directly upon the valve, the entire structure being mounted in and upon a single casing, thus avoiding the danger of one element coming loose and, by turning upon its mounting, preventing the operation of the valve when needed. It is a still further object to provide a lead-off for the vacuum lines at a point where they will not interfere with the operator, and where they can be carried behind the steering post, using the casing of the valve to house the feed to the lead-off. These and other objects and advantages of my invention will appear more clearly from the following description.

Reference is to be had to the accompanying drawings forming a part of this specification, in which similar reference characters indicate corresponding parts in all the views, and in which;

Fig. 1 is a plan view of my quadrant and casing, the location of certain normally invisible portions being shown in dotted lines.

Fig. 2 is a side elevation, partially in section showing the valve and its controlling mechanism and the vacuum take-off.

Fig. 3 is a diagrammatic plan view showing the control lever, quadrant and reverse-lock, with the upper plate of the quadrant removed.

Fig. 4 is a section taken on the line 4—4 of Fig. 2, a portion of the casing being broken away to show the air conduits therein, and showing the valve rotor in horizontal section.

Fig. 5 is a vertical transverse section of the casing taken on the lines 5—5 of Fig. 4, showing particularly the construction and disposition of the air conduits.

Fig. 6 is a vertical section, taken on the lines 6—6 of Fig. 4.

Fig. 7 is an elevation view of the valve rotor, its stem and the head to which the control handle is attached.

Fig. 8 is a plan view of the lower half of the casing, showing the conduits and outlet posts in this part.

Fig. 9 is a plan view of the valve rotor, viewed from beneath.

Fig. 10 is a horizontal section taken on the lines 10—10 of Fig. 2, showing the lock to prevent unauthorized shifting of the gears.

Fig. 11 is a plan view of the metallic diaphragm.

Referring to Figs. 1 and 2 my apparatus comprises a casing 12 having an upper section 14, a lower section 16, a valve mechanism 18 and a hand control lever 46.

The valve rotor 22, whose function is to direct the vacuum to the proper channel in order that the gears may be shifted, as desired, seats upon a flat raised portion 24 at one end of the casing section 14. Surrounding the rotor is a casing 26 which is mounted upon the portion 24 and is firmly fixed thereto by screws 28. It is thus seen that the casing 26 and the projection 24 form together a valve chamber, in which the rotor 22 can be rotated by a mechanism to be presently described.

On the upper face of the rotor 22 (see Fig. 7) is a ring 30, integral and concentric with the rotor. This ring is notched as at 32. Passing axially through the rotor and ring is a shaft 34 which may be tubular. This shaft is not directly connected to the rotor, but is free to move therein, while a driving connection between the two is provided as follows:

A collar 36 is mounted upon the shaft 34, and is fixed thereto in any convenient manner, such as by the pin 38. On the lower face of this collar are formed lugs 40 adapted to seat in the notches 32 in the valve rotor. Firmly fixed to the upper end of shaft 34 by means of a pin 42 is a head 44 forming part of the hand lever 46. Thus it will be seen that if the hand lever 46 be moved sidewise, the shaft 34 will be rotated, and this rotation will be imparted to the valve rotor 22 indirectly through the lugs 40 and the notches 32. By this means any lack of alignment is compensated for, and the rotor 22 will not be pulled from its seat, with consequent loss of vacuum by any small unevenness of action of the shaft 34 or lever 46, or interconnected parts. The rotor 34 will moreover be pulled firmly onto its seating surface 24 by means of the vacuum, as will be explained later.

Mounted over the valve casing 26 are a pair of sector plates 48 and 50, maintained at a fixed distance apart by spacing screws 52. Between these plates the rotor lever 46 projects outwardly, terminating in a convenient grip 54.

On the periphery of the lower sector plate 48 are a series of notches 56, 58, 60, 62 and 64. Corresponding to these notches there are on the upper sector a series of indices 66, 68, 70, 72 and 74, labeled respectively R, N, 1, 2, and 3, and corresponding, of course, to the positions reverse, neutral, first, second and third speeds of the gear shift. On the lower side of the lever 46 is fixed a projection 76 having a tubular bore just large enough to hold a metal ball 78. This ball is pressed inwardly against the sector 48 by means of a spring 82 abutting against a set screw 80. As the lever 46 is moved along the sector plates, the ball 78 will be pushed into the notches 56, 58, 60, 62 and 64, and held there by spring 82. The resistance of spring 82 is not sufficient to cause any difficulty when a deliberate attempt is made to move the lever, but is quite sufficient to prevent accidental and unintended movement of lever 46 and to maintain its position when once it is set.

A stop mechanism 84 is provided to prevent accidental shifting to reverse gear. This will not be described in detail as it forms a part of the subject matter of an application, Serial No. 107,592, filed May 8, 1926, by Alvin M. Craig.

The valve rotor 22, shown best in Figs. 2, 4 and 9 is essentially a flat cylindrical disk. In the lower face of this disk are two non-communicating grooves 86 and 88. The groove 86 is close to the periphery, and extends almost, but not entirely, around the circumference of the valve. This groove registers continuously with a port 100 in the upper face of casing 24, as will be described later, which port is in free communication with the atmosphere. The groove is also in continuous registry with ports and conduits leading to the various cylinders, and thus serves to connect these cylinders with the atmosphere at all times, except a given cylinder at a time when it is in active use.

Concentric with groove 86, and centrally thereof, is a second groove 88, which may be of less extent than the former. A branch of this groove extends radially outward, into that space where the outer groove would extend, if projected. By means of this extension, it is obviously possible by rotating the rotor 22, to connect the groove 88 selectively with the ports previously mentioned as in the path of groove 86. This groove 88 also registers continuously with a port 90, which is connected to a source of vacuum, thus permitting connection of any of the aforementioned ports, at will, with a vacuum line.

In the face of the extension 24 are represented the ports 92, 94, 96 and 98. These correspond to the positions reverse, first, second and third speeds respectively. No special port is required for neutral, since this position represents merely the state of affairs as illustrated in Fig. 4, where all of the ports are connected to the atmosphere, through the groove 86 and port 100.

Passing through the casing 12, and from the end which houses the valve, to the other end of the housing are the take-off conduits, connecting the ports 90, 92, 94, 96, 98, and 100 with their respective outlets, and disposed and constructed as follows:

The casing 12, as has been previously explained comprises two sections, 14 and 16, held together by screws 102 (Fig. 5). These parts, however, do not contact directly, but, as shown a flat sheet of metal 104 is interposed therebetween. This sheet is formed preferably of some sort of soft metal, such, for example, as lead, in order that the joint may be tight, and that there should be no leakage of air around the edges.

Longitudinal grooves 106, 108, 110, 112, 114 and 116 (Fig. 5) are cut in the inner faces of the section 14 and 16, three in each face, and extending from the ports 90, 92, 94, 96, 98 and 100, lengthwise of the casing, and terminating as will be described. While these grooves in the upper and lower sections are cut so as partially to overlap, they are kept separated by the metal sheet 104 (see Figs. 5 and 11) so that they define six separated ducts or conduits from the ports in the valve casing to the opposite end of casing 12. In order that the lower ducts 112, 114 and 116 may communicate with their respective ports, it is of course necessary that plate 104 be perforated at points opposite the ports in the valve casing; there will be three perforations, one registering with each duct 112, 114 and 116, and registering also with ports 98, 100 and 90. The other three ducts 106, 108 and 110 terminate at their valve end (Fig. 4) directly in ports 96, 94 and 92 respectively.

In Fig. 11 is shown a plan view of the plate 104. Perforations 125, 127 and 129 register with outlets 124, 126 and 128, respectively, and likewise register with conduits 106, 108 and 110, respectively. In this way, therefore, conduits 106, 108 and 110 feed into their respective take-off ports.

At the valve end of diaphragm 104 are three perforations 91, 101 and 99, which register on one side with valve ports 90, 100 and 98, respectively, and on the other side with grooves or conduits 116, 114 and 112, respectively, the entire assembly thus serving to connect valve ports 90, 98 and 100 with take-off ports 122, 118 and 120, respectively.

Suitable holes 103, are drilled through plate 104 to permit passage of screws 102 (Fig. 5) which connect the upper and lower sections of the casing. Only two of these screw holes have been illustrated, but it is to be understood that they are suitably disposed in location and number.

At the opposite end of the casing 12 from the valve end, the section 16 is pierced by six holes 118, 120, 122, 124, 126 and 128. As shown in Fig. 8, three of these holes 118, 120 and 122 register with the grooves or ducts 112, 114 and 116, respectively. The other three holes 124, 126 and 128 are connected, by means of registering perforations in the gasket 104, with grooves 106, 108 and 110, respectively in the upper section 14. The casing 16 at this point is offset downwardly, to form a circular head 130 (Fig. 2), which for convenience will be called the take-off. Suitable unions 132 screwed into five of the holes 118, 122, 124, 126 and 128 provide for the connection of five metallic tubes 134 into the respective holes. Four of these tubes, viz those connected with holes 118, 124, 126 and 128 are connected at their other ends, not shown, with the cylinders of the gear shifting mechanism, in a conventional manner that is no part of the present invention. The tube or pipe connected with hole 122 is connected with the intake manifold of the motor or other suitable source of vacuum, and provides the vacuum supply line. The sixth hole 120, opens directly to the atmosphere, and serves to feed air to the gear shifting cylinders to restore the pistons to neutral position.

The following tabulation presents the connections as described above.

| Port | Conduit | Hole | Controls |
|---|---|---|---|
| 96 | 106 | 124 | 2nd |
| 94 | 108 | 126 | 1st |
| 92 | 110 | 128 | Rev. |
| 98 | 112 | 118 | 3rd |
| 100 | 114 | 120 | Air |
| 90 | 116 | 122 | Vac. |

Other connections might of course be made, but the above arrangement has been found convenient and has been used in the present description.

The fluid circuit should be obvious from the above description. The vacuum line, feeding into hole 122, through conduit 116 and port 90 into groove 88, can be applied, by turning handle 54, to any of the ports 92, 94, 96 or 98. Whichever port has been connected to the vacuum line, its corresponding gear shift cylinder is then evacuated through its connecting conduit, hole and pipe 134. All of the other cylinders are simultaneously connected, through hole 120, conduit 114, and grooves 86 to the free atmosphere.

Since my apparatus is intended to be located just under the steering wheel of the car, I have provided in the side of the casing a clamp 136 comprising a jaw 138 fixed to the casing and a loose jaw 140, the two being connected by means of the screw 142 or otherwise. This clamp member is adapted to surround and clamp upon the steering post, and is shown in position in Fig. 2, being mounted immediately under the steering wheel. While I have shown a clamp 136 adapted to grasp a round post, it is obvious that it may be made to fit a post of any other desired shape.

When the casing is applied to the steering post of an automobile with the lever 46, 54 projecting toward the operator in a position convenient to operate, it will be seen that the casing will curve around the steering post, in such a way that the take-off will be positioned on the opposite side of the post from the operator. Then the tubes 134 will not interfere with the operator, and may be led down through the floor of the car, or may be disposed in any desired manner, through the instrument board, or otherwise. The advantages of this system are obvious. There is always considerable crowding in the neighborhood of the foot pedals, and the addition of valves, conduits, etc., at this point accentuates the difficulties. If, as in older systems, the quadrant is separated from the valve, the former mounted at the top of the post and the latter near the floor both on the side of the post nearest the operator, and the two operatively connected by a rod, the operator's knee is almost certain to strike this connecting rod, bending it, or moving one of the two elements out of alignment with the other, causing a strain in the connecting rod and interfering with or absolutely preventing ready shifting of gears. This dangerous condition I have completely eliminated. By consolidating the valve and its control, leading the conduits to the opposite side of the steering post and taking-off from this location, I have made it completely impossible for the operator to injure the mechanism by striking it, bumping or kicking it, and I have added to the operator's comfort by leaving him as much leg, knee and foot room as he would have if no pneumatic gear shift mechanism had been added to the car.

A tubular guard 144 may surround the pipes 134 to conceal the same.

In Fig. 10 is illustrated a lock mechanism, designed to enable the operator to lock the lever 46 in neutral position, preventing shifting of the gears. This comprises a lock 146, with a removable key 148. This key operates a plunger 150 which registers with and is adapted to enter a hole 152 drilled in the rotary valve driving shaft 34. The lock is mounted in casing 12, and hole 152 is so located that it will be opposite plunger 150 when lever 46 is in neutral position. In this way, movement of the lever and shifting of the gears can be prevented, and theft of the car greatly hindered if not completely foiled.

Seating of the valve rotor 22, which is facilitated by the loose connection clearly illustrated in Fig. 7, and described in connection therewith, is further aided by a spring 154 pressing against part 30 of the rotor (Figs. 2 and 7) and against the upper wall of valve housing 26 (Fig. 2). This seating is further aided by the vacuum in the groove 88, which tends to keep the rotor fitting snugly against the face of the seat 24, preventing vacuum losses. Similarly, losses between the valve and the take-off 130 are prevented by the soft metal sheet or gasket, which being yielding, will effectually prevent leakage between the sections 14 and 16, as well as serving as a wall converting grooves 106, 108, 110, 112, 114 and 116 into vacuum conduits. This structure is obviously the simplest that could be devised to bring the lines from front to back of the wheel, making complicated borings or bent tubes, etc., unnecessary, and permitting the formation of the conduits by a simple grooving operation.

It will be obvious to anyone skilled in the art that various modifications of my apparatus could be made at will without comprising invention. Thus, obviously, the relative position of grooves 86 and 88 could be reversed, the vacuum groove placed on the outside and the air groove on the inside. Considerable variation in the disposition of the grooves might be introduced. Thus, instead of putting half the conduits in each face, they might all be placed in one face, or a different number in each face. In cases where more shifts than the standard number of four are needed, such as in heavy trucks, the number of grooves would have to be increased.

Other changes of like nature could be made in the structural details of my apparatus, and are to be considered as covered by my invention, which is to be limited only by the prior state of the art and the appended claims.

I claim:

1. In an apparatus of the class described, a casing adapted to be mounted upon and partially encircle a steering post, said casing comprising an upper and a lower section, fluid controlling means mounted at one end of the upper section, fluid distributing means mounted at the opposite end of the lower sections, and conduits within said casing connecting said controlling and distributing means.

2. In an apparatus of the class described, a casing adapted to be mounted upon and partially encircle a steering post, said casing comprising an upper and a lower section, fluid controlling means mounted at one end of the upper section, fluid distributing means mounted at the opposite end of the lower sections, and conduits within said casing connecting said controlling and distributing means, said conduits comprising grooves formed in the opposed faces of said sections.

3. In an apparatus of the class described, a casing adapted to be mounted upon and partially encircle a steering post, said casing comprising an upper and a lower section, fluid controlling means mounted at one end of the upper section, fluid distributing means mounted at the opposite end of the lower sections, and conduits within said casing connecting said controlling and distributing means, said conduits comprising grooves formed in the opposed faces of said sections and a plate interposed between said opposed faces, said plate forming a portion of the walls of each of said conduits.

4. In an apparatus of the class described, a casing adapted to be mounted upon and partially encircle a steering post, said casing comprising an upper and a lower section, fluid controlling means mounted at one end of the upper section, fluid distributing means mounted at the opposite end of the lower sections, and conduits within said casing connecting said controlling and distributing means, said conduits comprising grooves formed in the opposed faces of said sections, and a plate of soft metal interposed between said opposed faces, said plates forming a portion of the walls of each of said conduits, and serving to form a fluid-tight seal between said opposed faces.

5. In an apparatus of the class described, a casing adapted to be mounted upon and partially encircle a steering post, said casing comprising an upper and a lower section, fluid distributing ports mounted at one end of said lower section, a fluid controlling valve mounted at the opposite end of the upper section, a plate separating said sections, grooves in the lower face of the upper section, ports connecting said valve with said grooves, said grooves being connected at their opposite ends with said fluid distributing ports.

6. In an apparatus of the class described, a casing adapted to be mounted upon and to partially encircle a steering post, said casing comprising an upper and a lower section, grooves in the upper face of said lower section, said grooves extending to the opposite end of said section, a fluid controlling valve in the end of said upper section, opposite said distributing ports, said grooves being connected at their opposite ends with valve ports and fluid distributing ports.

7. In an apparatus of the class described, a casing adapted to be mounted upon and to partially encircle a steering post, said casing comprising an upper and a lower section, longitudinal grooves in the lower face of the upper section, correspondingly placed grooves in the upper face of the lower section, a metal diaphragm interposed between said faces and separating said grooves, fluid controlling means mounted in one end of said casing, ports leading from said controlling means to said grooves, fluid distributing means at the opposite end of said casing, said grooves terminating in said distributing means.

In testimony whereof, I have signed my name to this specification.

HARRY T. GOSS.